(12) United States Patent
Xiang et al.

(10) Patent No.: US 6,266,140 B1
(45) Date of Patent: Jul. 24, 2001

(54) CORRECTED CONCENTRIC SPECTROMETER

(75) Inventors: Lian Qin Xiang, Acton; Thomas Mikes, Ashby, both of MA (US)

(73) Assignee: American Holographic, Inc.

( * ) Notice: Subject to any disclaimer, the term of this patent is extended or adjusted under 35 U.S.C. 154(b) by 0 days.

(21) Appl. No.: 09/674,217

(22) PCT Filed: Apr. 29, 1999

(86) PCT No.: PCT/US99/09270

§ 371 Date: Oct. 27, 2000

§ 102(e) Date: Oct. 27, 2000

(87) PCT Pub. No.: WO99/56096

PCT Pub. Date: Nov. 4, 1999

Related U.S. Application Data

(60) Provisional application No. 60/083,471, filed on Apr. 29, 1998.

(51) Int. Cl.[7] .................... G01J 3/28; G01J 3/40

(52) U.S. Cl. .......................... 356/328; 356/305

(58) Field of Search ...................... 356/328, 305, 356/326, 334

(56) References Cited

U.S. PATENT DOCUMENTS

| | | | |
|---|---|---|---|
| 5,768,040 | 6/1998 | Macenka et al. | 359/859 |
| 5,859,702 | 1/1999 | Lindblom | 356/305 |
| 5,880,834 | 3/1999 | Chrisp | 356/328 |

*Primary Examiner*—Frank G. Font
*Assistant Examiner*—Layla Lauchman

(57) ABSTRACT

A high resolution aberration corrected concentric spectrometer (10) includes a convex diffraction grating (60) having a plurality of nonparallel lines. The curved lines of the convex grating (60) provide correction for field aberrations. The utilization of a convex diffraction grating (60) enables the present spectrometer (10) to provide highly accurate spectral imaging with greatly improved resolution. By utilizing the convex diffraction grating (60) with the nonparallel grooves, the spectrometer is functional for a large number of applications.

15 Claims, 3 Drawing Sheets

CORRECTED CONCENTRIC SPECTROMETER

CROSS REFERENCE TO RELATED APPLICATIONS

This application claims priority under 35 U.S.C. § 119(e) to provisional patent application Ser. No. 60/083,471 filed Apr. 29, 1998; the disclosure of which is incorporated herein by reference.

STATEMENT REGARDING FEDERALLY SPONSORED RESEARCH OR DEVELOPMENT

Not Applicable

BACKGROUND OF THE INVENTION

A typical spectrometer is used to provide a spectral image of a scene. The scene to be measured is imaged along an entrance slit via a conventional telescope image system or the like. Each feature of the scene is spectrally dispersed by the spectrometer so that a corresponding spectral image of the scene is produced at the receiver. The spectrometer must measure the equivalent of hundreds of spectra at the same time. Each spectra must not interfere with adjacent spectra, thus high spatial and spectral imaging resolution is required. Most commercial spectrometers are not capable of high spatial imaging resolution and low distortion because optical aberrations, such as field curvature and the like, tend to distort the spectral image of the slit. The advent of large charge coupled detector (CCD) arrays has made it possible to sample an image with over a million separate detectors (pixels). It would be desirable to have a spectrometer that can preserve the inherent CCD spatial resolution and provide optical imaging of the desired spectra that has a resolution and absence of distortion that fits the CCD array rectilinear geometry.

BRIEF SUMMARY OF THE INVENTION

A high resolution aberration corrected concentric spectrometer includes a convex diffraction grating having a plurality of nonparallel lines. The curved lines of the convex grating provide correction for field aberrations. The utilization of a convex diffraction grating enables the present spectrometer to provide highly accurate spectral imaging with greatly improved resolution. By utilizing the convex diffraction grating with the nonparallel grooves, the spectrometer is functional for a large number of applications.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
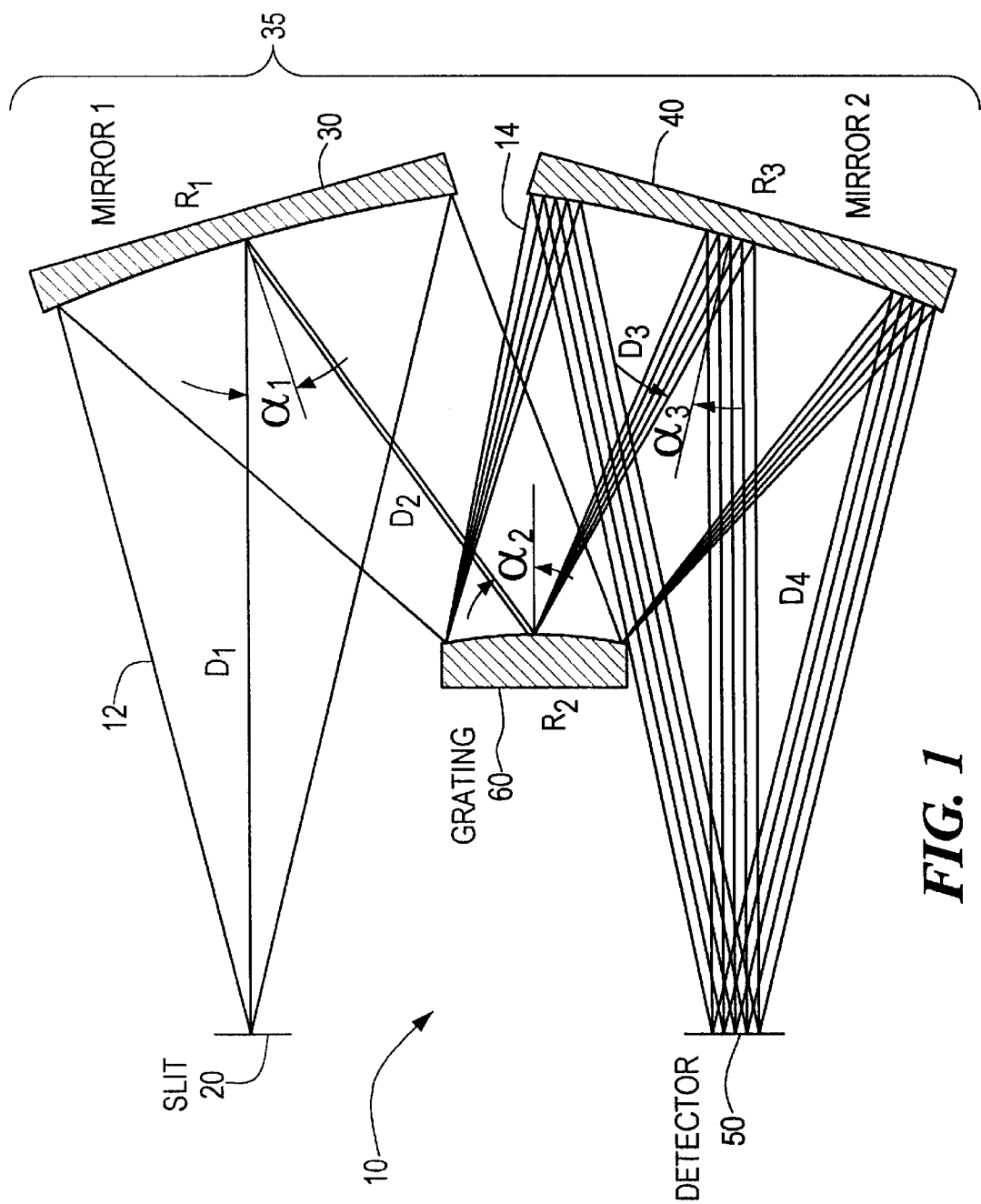
FIG. 1 is a schematic diagram of a prior art spectrometer.

Referring to FIG. 1, a prior art spectrometer 10 is shown. In this spectrometer light from an image 8 passes through a slit 20. A first concave mirror 30 that is part of a reflective assembly 35 receives the image from the slit 20. The first mirror 30 is in a light path from the slit 20 to a convex diffraction grating 60. The convex diffraction grating 60 receives the reflected image from the first mirror 30. The convex diffraction grating spectrally disperses the image received from the first mirror 30 into a spectral image 14. A second concave mirror 40 of the reflective assembly 35 receives the spectral image 14 from the convex diffraction grating 60 and reflects this spectral image 14 to a detector 50 such as a CCD array of a camera or other device.

Figure 2:
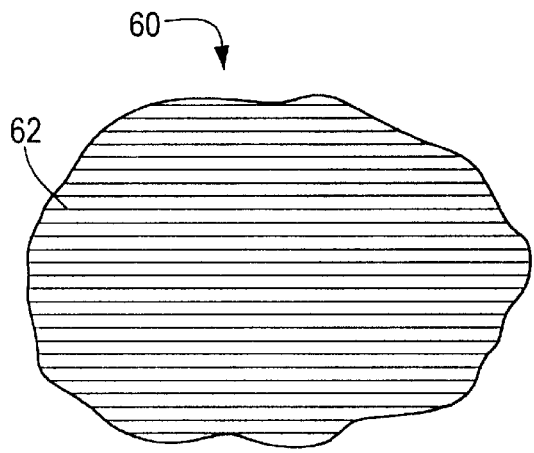
FIG. 2 is a diagram of a prior art grating.

Referring now to FIG. 2, a portion of the convex diffraction grating 60 is shown. The grating 60 includes a plurality of linear grooves 62 etched or milled into the surface of the grating 60 using known techniques. The grooves 62 are generally parallel to each other and evenly spaced apart when they are projected to a tangential plane touching the grating vertex, though some embodiments may have the grooves spaced different distances from each other. The diffraction grating is used to spatially disperse light by wavelength. A beam of white light incident on the grating is separated into its component colors, with each color diffracted along a different direction. The convex diffraction grating 60 thus shown provides for spectral dispersion of an image applied to the grating.

The formation of the above described grating can be accomplished by two methods. One method is to use a diamond or similar material to mechanically rule the lines into the surface of the substrate such as glass or plastic. Mechanical ruling typically produces a grating having a triangular or staircase style cross-section.

Figure 3:
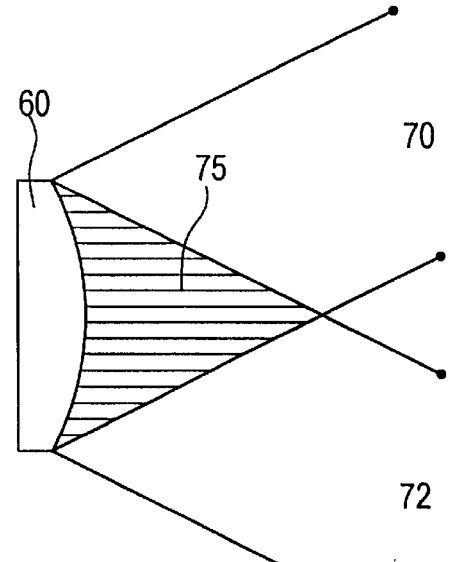
FIG. 3 is a diagram of the formation of the prior art grating of FIG. 2.

Referring to FIG. 3, the formation of a grating by a second method known as holographic grating or interference grating is shown. In this method the grating is formed by providing a substrate or blank which has a surface coating of photoresist. Two spaced apart light sources or recording points 70 and 72, such as lasers, have their light shown on the substrate to provide an interference pattern 75. The resulting interference pattern 75 comprises a set of straight equally spaced lines that are applied to the photoresist. During chemical development and etching of the photoresist that has been exposed to the interference pattern, a surface relief comprising a plurality of equally spaced lines is formed on the substrate. In this method all of the lines of the resulting grating are formed at the same time. Additionally, the resulting grating has a sinusoidal cross-sectional shape, as opposed to the stair-case shape grating which has each line formed individually produced by mechanical ruling. Once a first or master grating is made, additional gratings may be made by casting or replication from the master grating. Other known forms of grating manufacturing may also be used.

A spectrometer using the diffraction grating described above produces a resulting spectral image that tends to widen from, for example, the blue to red spectra. As a result, the spectral image can overlap adjacent spectral images, resulting in a loss of resolution. This effect is known as "keystoning".

Figure 4:
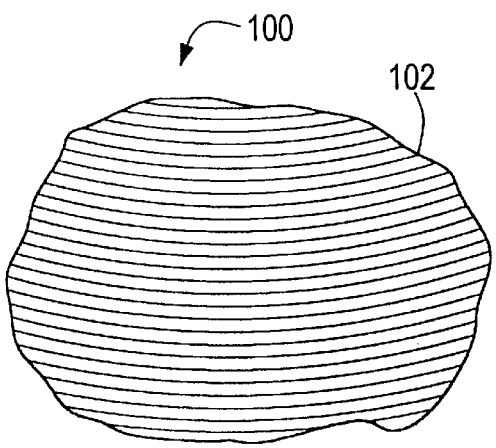
FIG. 4 is a diagram of a corrected concentric grating of the present invention.

Referring now to FIG. 4 a portion of an aberration corrected convex diffraction grating 100 is shown. This grating 100 includes a plurality of curved and typically nonparallel grooves 102 etched or milled into the surface of the grating 100. The utilization of curved, nonparallel grooves 102 provides additional optical power. The additional optical power corrects for aberrations such as keystoning in the spectral dispersion of an image, providing for simultaneous high spatial and spectral imaging resolution and low distortion.

Figure 5:
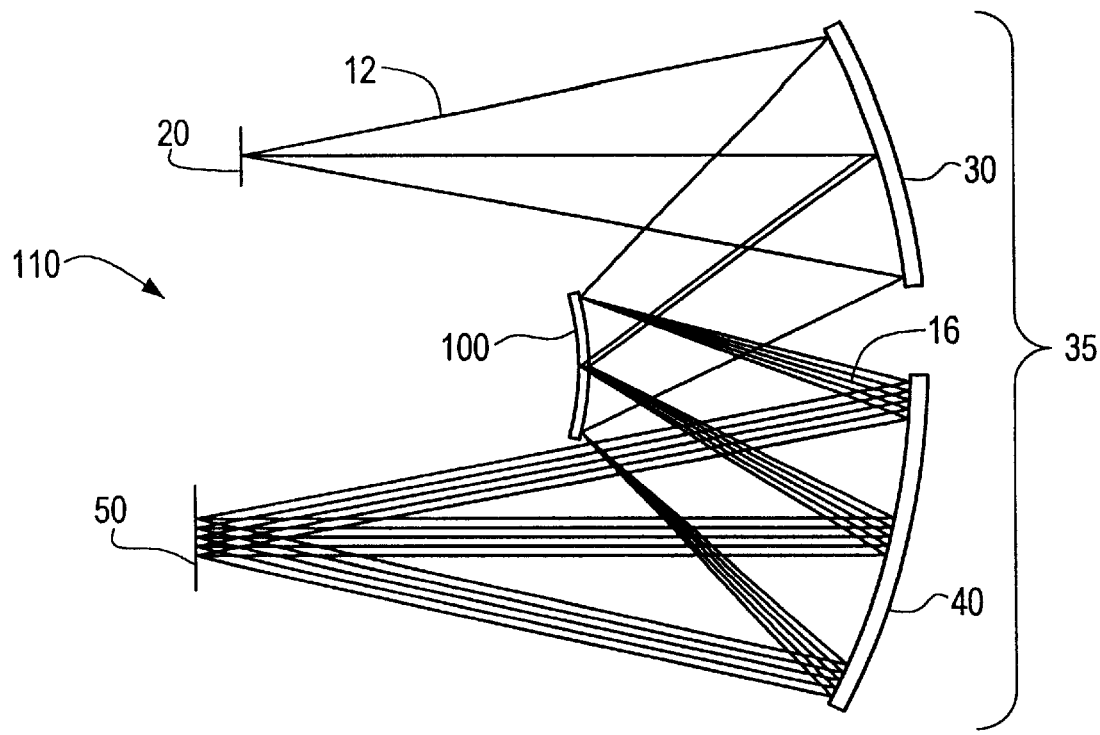
FIG. 5 is a schematic diagram of a spectrometer including the corrected concentric grating of the present invention.

Referring now to FIG. 5, a corrected concentric spectrometer 110 is shown which includes the aberration corrected convex diffraction grating 100. The arrangement of the aberration corrected concentric spectrometer of FIG. 5 is similar to that of the conventional spectrometer shown in FIG. 1, except that the aberration corrected convex diffraction grating 100 has been substituted for the conventional grating 60.

In this spectrometer 110 an image 12 is received through a receiver such as a slit 20. A first mirror 30 that is part of a reflective assembly 35 receives the image 12 from the slit 20. The first mirror 30 is in an optical path between the slit 20 and with the aberration corrected convex diffraction grating 100. The corrected convex diffraction grating 100 receives the reflected image from the first mirror 30. The corrected convex diffraction grating spectrally disperses the image received from the first mirror 30 into a spectral image 16 which is free from optical aberrations. A second mirror 40 of the reflective assembly 35 receives the spectral image 16 from the corrected convex diffraction grating 100 and reflects this spectral image 16 to a detector 50 such as a CCD or other detector array in a camera or the like. As a result of the utilization of the aberration corrected convex diffraction grating 100 the spectrometer 110 and corrects for the effects of keystoning and thus provides for much higher resolution than known spectrometers.

The individual parts of the corrected concentric spectrometer 100 may be adjusted in order to provide proper alignment within the spectrometer. The slit 20, the reflective assembly 35, the corrected convex diffraction grating 100 and the detector 50 may be individually adjustable in order to provide the proper alignment necessary to receive the image and provide the spectrally dispersed image.

Figure 6:
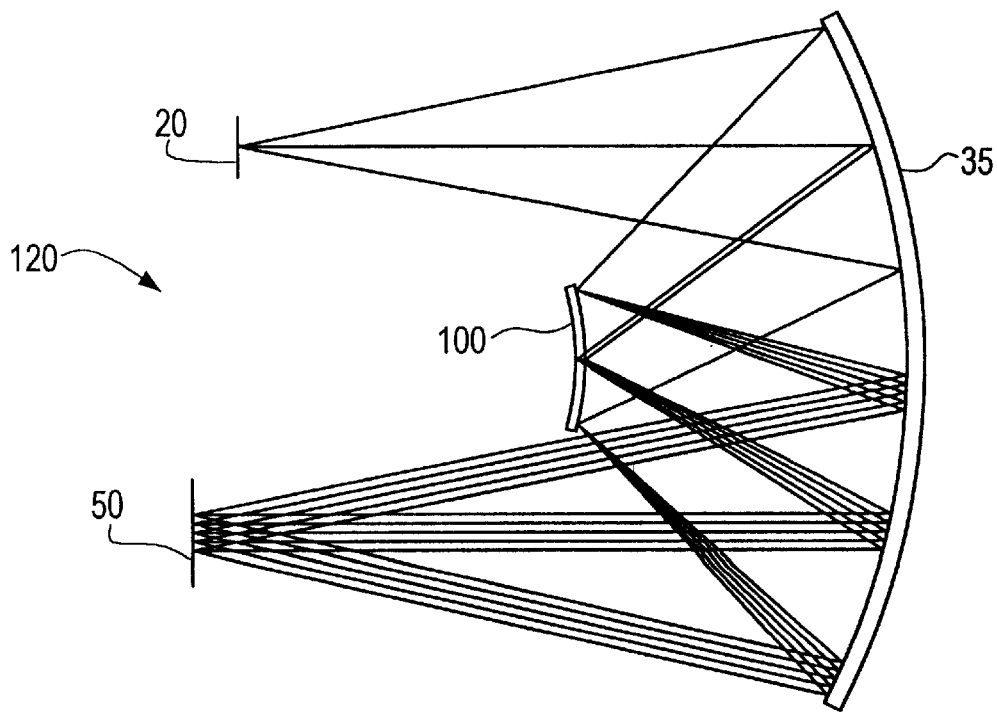
FIG. 6 is a schematic diagram of an additional embodiment of the spectrometer including the corrected concentric grating.

Referring now to FIG. 6, a second embodiment 120 of a corrected concentric spectrometer is shown. The arrangement of the corrected concentric spectrometer 120 of FIG. 6 is similar to that shown in FIG. 5, however in this embodiment the reflective assembly is realized as a single mirror. A first portion of the mirror is in communication with the slit 20 and the corrected convex diffraction grating 100, and a second portion of the mirror is in communication with the corrected convex diffraction grating 100 and the receiver 50.

Figure 7:
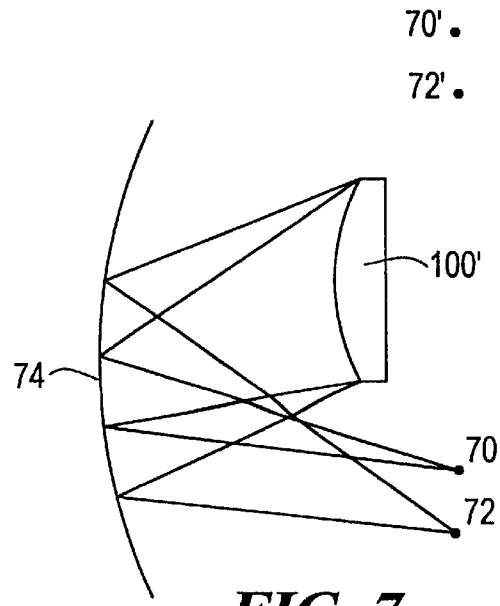
FIG. 7 is a diagram of how the corrected concentric grating of FIG. 5 is formed.

Referring now to FIG. 7, the corrected convex diffraction grating is formed in a different manner as opposed to the above-described methods for uncorrected gratings. While it may be possible to mechanically rule the plurality of non-parallel grooves required to form the aberration corrected diffraction grating shown in FIG. 4, a preferred method of forming the aberration corrected diffraction grating is shown. In this method the blank or substrate 100' has a layer of photoresist applied to the surface thereof. Two spaced apart light sources or recording points 70 and 72, such as lasers, have their light directed onto the substrate by curved reflective element 74. The reflected light from the two light sources provides an interference pattern. The resulting interference pattern 75 comprises a set of curved equally spaced lines that expose the photoresist accordingly. During chemical development of the photoresist that has been exposed to the interference pattern, a surface relief comprising a plurality of curved equally spaced lines is formed on the substrate. In this method the resulting grating is formed at onetime and has a sinusoidal cross-sectional shape. The resulting aberration corrected convex diffraction grating can be used to cast duplicate gratings.

The placement of the recording points 70 and 72 is governed by the requirements for the particular spectrometer as defined by the application. Once that those specifications are known, the recording points can be derived by the use of a merit function such as a ray tracing program like "ZE Max" as an example. The position of the mirrors 30 and 40 are variable in the merit function and these can also be adjusted in the use of the ray tracing approach to optimize the merit function's fit to the specifications. the recording points 70 and 72 can be substituted with recording points 70' and 72' that are focal points for the points 70 and 72 and the grating surface photoresist can then be exposed through the back of the grating.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

We claim:

1. A corrected concentric spectrometer comprising:
   a receiver for receiving an image;
   a reflective assembly in optical communication with said receiver;
   an aberration corrected convex diffraction grating in optical communication with said reflective assembly, said corrected diffraction grating including a plurality of curved non-parallel grooves; and
   a detector in optical communication with said aberration corrected convex diffraction grating.

2. The spectrometer of claim 1 wherein said receiver comprises a slit.

3. The spectrometer of claim 1 wherein said receiver is adjustable.

4. The spectrometer of claim 1 wherein said reflective assembly comprises a first mirror, a first portion of said first mirror in communication with said receiver and said aberration corrected convex diffraction grating and a second portion of said first mirror in communication with said aberration corrected convex diffraction grating and said receiver.

5. The spectrometer of claim 1 wherein said reflective assembly comprises a first mirror in communication with said receiver and said aberration corrected convex diffraction grating and a second mirror in communication with said aberration corrected convex diffraction grating and said receiver.

6. The spectrometer of claim 4 wherein said first mirror is spherical.

7. The spectrometer of claim 5 wherein said first mirror and said second mirror are spherical.

8. The spectrometer of claim 6 wherein said first mirror is concave.

9. The spectrometer of claim 7 wherein said first mirror and said second mirror are concave.

10. The spectrometer of claim 4 wherein said first mirror is adjustable.

11. The spectrometer of claim 7 wherein said first mirror and said second mirror are adjustable.

12. The spectrometer of claim 1 wherein said aberration corrected convex diffraction grating is convex.

13. The spectrometer of claim 1 wherein said receiver comprises a charge coupled device camera.

14. The spectrometer of claim 1 wherein at least some of said plurality of curved grooves are equally spaced from each other.

15. The spectrometer of claim 1 wherein at least some of said plurality of curved grooves are unequally spaced from each other.

* * * * *